March 25, 1952 — R. PUDELKO — 2,590,459

MAXIMUM DEMAND METER

Filed Nov. 30, 1946

INVENTOR.
RICHARD PUDELKO
BY
Morgan, Finnegan & Durham
ATTORNEYS.

Patented Mar. 25, 1952

2,590,459

UNITED STATES PATENT OFFICE 2,590,459

MAXIMUM DEMAND METER

Richard Pudelko, Zug, Switzerland, assignor to Landis & Gyr, A. G., a body corporate of Switzerland Application November 30, 1946, Serial No. 713,263

3 Claims. (Cl. 346—30)

1

The present invention relates to a maximum demand measuring and recording mechanism.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serve to explain the principles of the invention.

Figure 1:
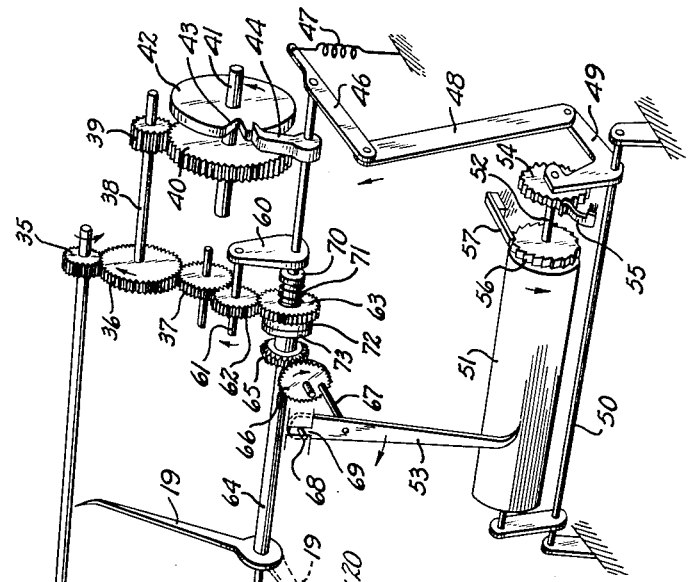
Figure 2:
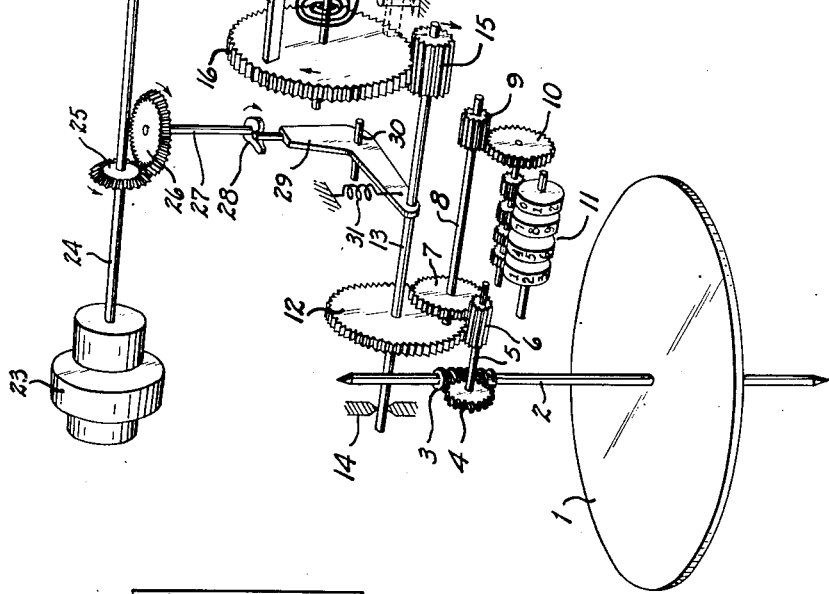

Fig. 1 of the drawing is a perspective view of a schematic form of mechanism embodying the present invention, and Fig. 2 illustrates the record produced by the mechanism as shown in Fig. 1.

In known maximum demand meters which are employed for the determination of the maximum demand in electric power installations a driving member is usually driven by the meter system and moves a frictionally held indicator (maximum indicator) or, in another form of such devices, a recording mechanism, and these at regular intervals of time of, for example, fifteen minutes (called recording periods) are uncoupled from the meter by means of a timing element and are returned to the initial position. Thereafter they are again coupled to the meter to indicate maximum demand.

In the maximum demand meters usually employed the maximum average value of the consumption during each recording period which has been entered within a reading or charging period, for example a month, can be read off on the maximum device. In these meters there is an indicating instrument which must be manually re-set to zero after the expiration of a reading or charging period, and an employee of the power company is obliged to go to the place where the meter is installed in order to read off the maximum, note it down, and return the maximum pointer to zero.

In maximum demand meters which make a written record, the average value of the load during each individual recording period is usually recorded on a paper strip or the like as a line indication and/or as a number. The paper strip is usually required to be changed every month. In some cases the strip may be used for two months, but this requires a recording strip of great length.

The ordinary maximum demand meters, although comparatively simple and inexpensive, are thus imperfect or incomplete in their operation, and the recording maximum demand meters, while making complete records, are complex and expensive.

It is an object of the present invention to provide a maximum demand meter which has most of the capabilities and advantages of the recording maximum demand meter but is much simpler in construction and operation and more economical.

The invention comprises a maximum demand meter having a driver acting from the armature of the meter upon a maximum indicator, and the driver at regular intervals of time, that is, at the end of each recording period, is uncoupled from the meter, returned to its initial position, and again coupled to the meter. A time-controlled device is provided to automatically return the maximum indicator to the zero position at the expiration of a reading or charging period from its maximum position reached within the period, and a recording mechanism makes a written record of the maximum position of the indicator at the time of its return to zero position.

It will be understood that the foregoing general description and the following detailed description as well are exemplary and explanatory of the invention but are not restrictive thereof.

Referring now in detail to the illustrative embodiment of the invention shown by way of example in the accompanying drawing a meter driving disc 1 of any known type of electricity meter is mounted on shaft 2 to drive the shaft and therewith a worm 3 on the shaft and a worm wheel 4 meshing with wheel 3. Worm wheel 4 is mounted on shaft 5 carrying a pinion 6 in mesh with a gear 7 on shaft 8 which also carries a pinion 9 to drive gear 10. The metering mechanism 11 is thus driven from disc 1 and indicates the total power consumption. The disc 1 also, through gear 12 meshing also with pinion 6, drives shaft 13 which is pivotally arranged and journalled in bearing 14. Pinion 15 on shaft 13 meshes with gear 16 on shaft 17 to drive said gear from disc 1, and the gear carries a driver element or arm 18 to engage and move a maximum pointer 19 from its zero position against a stop 20 as shown in dotted lines in the drawing to a maximum indicating position as shown. The gear 16 with its driver 18 is urged in an opposite direction (counterclockwise) by a coiled spring 21 which is connected between shaft 17 and a stationary part of the mechanism.

The means for periodically returning the driver 18 under action of spring 21 to its zero position against a stop 22 (as shown in dotted lines in the drawing) includes a timing element in the form of a synchronous motor 23 driving shaft 24 and thereby mitre gears 25 and 26 mounted on shafts 24 and 27 respectively. A cam 28 on shaft 27 is rotated therewith, and engages one arm of a bell crank lever 29 which is pivotally mounted on shaft 30 and urged against cam 28 by a spring 31. The shaft 13 is journalled in the other arm of lever 29 and the arrangement is thus such that at regular intervals of time the motor 23 through cam 28 pivots lever 29 to displace shaft 13 and carry pinion 15 out of mesh with gear 16. This action is timed to occur at relatively frequent intervals of time, recording periods, of about 15 minutes, for instance, and the driver 18 at such times is returned to its initial or zero position against stop 22. The pointer 19 retains its maximum indicating position until engaged by driver 18 to establish a new maximum or until returned at the end of a reading or charging period by mechanism presently to be explained.

The synchronous motor 23 as the timing element also drives a pinion 35 mounted on the end of shaft 24, which meshes with a gear 36 which in turn meshes with and drives a gear 37 from which the pointer 19 may receive power to be returned. Gear 36 is mounted on a shaft 38 which also carries a gear 39 to turn therewith, and gear 39 engages and drives a gear 40 on shaft 41, said shaft also carrying the control disc 42. The control disc is thus arranged to be continuously driven by motor 23, and a notch 43 in the periphery of the disc is adapted to receive the end of dog 44 every complete revolution of the disc. Dog 44 is rigidly mounted on a shaft 45 and the shaft is turned slightly in a clockwise direction when the dog 44 falls into notch 43.

A lever 46 rigidly mounted on the end of shaft 45 is biased in one direction by the action of spring 47 whereby dog 44 is forced against the periphery of control disc 42. Lever 46 is connected by means of rod 48 with a lever 49 pivotally mounted upon shaft 50. A recording cylinder 51 is rigidly mounted on a shaft 52 one end of which is carried by an arm of lever 49. It will be apparent that the falling of dog 44 into notch 43 has the effect of tilting lever 49 to displace cylinder 51, the object of such displacement being to carry the surface of the cylinder into contact with the recording hand or stylus 53 for marking as will be described. Such displacement of shaft 52 also carries a toothed wheel 54, rigidly mounted on shaft 52, into engagement with a fixed pawl 55, which serves to hold the drum 51 against rotation while it is in writing position. When dog 44 moves out of notch 43, cylinder 51 is returned to its original position away from hand 53, and a second toothed wheel 56 on shaft 52 engages a fixed pawl 57 which serves to turn the cylinder 51 to a new position for the next recording by hand 53.

The rotation of shaft 45 brought about when dog 44 drops into notch 43 also brings about the return of pointer 19 to its zero position and simultaneously the marking of cylinder 51 by hand 53. As shown in the drawings, shaft 45 has rigidly secured thereto a lever 60 carrying shaft 61 upon which gear 62 is rotatably mounted. Gear 62 is in mesh with a gear 63 rotatable on shaft 45 and connected to a sleeve 64 to which the pointer 19 is also fast. It will be apparent that as gear 62 is swung into engagement with the continuously rotating gear 37, the pointer 19 will be turned back to its original or zero position against stop 20. The pointer 19 is prevented by the action of the friction hubs 72 and 73 from opposing the movement of the driver 18 during the time that the sleeve 64 is returning the pointer 19 to its zero position. The hubs 72 and 73 are rigidly coupled to the left face of the gear 63 and the right face of the gear 65, respectively, and are in friction contact with each other. The sleeve 64 extends along the shaft 45 to a point to the right of the gear 63 but to the left of the lever 60. A collar 70 is located at the end of the sleeve 64. A spring 71 is interposed between the collar 70 and the gear 63 and presses the hub 72 against the hub 73. The hubs 72 and 73 prevent shaft 45 from moving the pointer 19 in opposition to the driver 18. Thus, after driver 18 has been returned to its zero position and is again moving in response to the disc 1, it can register a response on the pointer 19 even while the shaft 45 is rotating in an opposite direction.

At the same time mitre gear 65, also fast on sleeve 64 rotates gear 66 in mesh therewith. The gear 66 carries a crank pin 67 which is connected to the hand 53. The hand 53 has a sliding engagement with the framework by means of pin 68 at its base arranged in a guideway 69, whereby the movement imparted to the hand through pin 67 is translated into straight movement of the hand to mark a straight line on the cylinder 51. The guideway 69 is of such length that the straight movement of the hand 69 will occur during 45° arcs from the mid point of the guidway 69. Thus the hand 53 will move in a straight line for a total of 90° which is great enough to include the maximum length line that might be drawn.

The gear ratios of the gears to the control disc 42 are such that the dog 44 is moved only at the end of a reading or evaluation period, as a rule one month, to return the maximum pointer 19 to its zero position, its dotted line position in the drawing, thus performing the work an employee usually has to accomplish by hand at the end of a reading period.

In operation, the meter disc 1 drives the metering mechanism 11 to indicate the total energy consumption, the continuously rotating synchronous motor 23 disengaging the driver 18, which is also driven by the meter disc, from the meter disc at the end of each period of registration, and allowing it to be returned to the zero position at 22, and engaging it again with the meter disc. During this operation the maximum pointer 19 reaches a definite position, for example the one shown in full lines in the drawing, which illustrates the state shortly before the monthly turning back of the maximum pointer and the recording or indicating means connected therewith. This return takes place as soon as the dog 44 drops into notch 43 of the control disc 42, which engages the gear 62, with the result that on the one hand the maximum pointer 19 is returned to the zero position and that on the other hand the recording hand 53 records, as it is operated by the crank pin 67 and guided by the guide 69, a line along a surface of the recording drum 51. When the maximum pointer 19 reaches zero position, the line drawn by the recording hand 53 reaches the axis of abscissas of the recording strip. Recording takes place at a point of the recording drum corresponding to its forward movement by the pawl 57.

In the meter construction of the invention shown and described it will be apparent that the maximum indicator does not have to be returned, as in the ordinary maximum meters, every month by an employee of the power company to the zero position, but the return takes place automatically by the time element employed. In this arrangement at the time of the return movement of the maximum indicator a written record is simultaneously made on a record paper. In contradistinction to the recording maximum demand meters heretofore known, the recording of the maximum takes place at each reading period (for example, each month) and not at each recording period (e. g. fifteen minutes). Thus a recording strip of about 12 mm. long and about 100 mm. broad is sufficient for a whole year. The employee from the power company does not need to read the apparatus punctually at the end of each reading period, since the corresponding record takes place automatically.

The whole device is made such that it can be built into the meter in place of the normal maximum demand mechanism, in which arrangement in order to change the small record strip the upper part of the meter casing must be provided with a suitable door.

The invention in its broader aspects is not limited to the specific mechanisms shown and described but departures may be made therefrom within the scope of the accompanying claims without departing from the principles of the invention and without sacrificing its chief advantages.

What I claim is:

1. An energy metering and recording mechanism including in combination a meter, driving means connected to the meter, means for returning the driving means to an original position after the expiration of a predetermined period of time, an indicator to be engaged by said driving means to indicate maximum movements thereof, mechanically operated means for automatically returning said indicator to an original position after the expiration of a second predetermined period of time, said period comprising a plurality of said first periods, and recording means connected to said indicator returning means for making a permanent record of the maximum position of said indicator during the return thereof to the original position, said recording means comprising a recording hand connected to said indicator to follow maximum indicating and returning movements thereof and a record receiving member movable to engage said hand during returning movement of said indicator.

2. An energy metering and recording mechanism including in combination a meter, driving means connected to the meter, constantly operating power means, means timed from said power means for returning the driving means to an original position after the expiration of a predetermined period of time, an indicator to be engaged by said driving means to indicate maximum movements thereof, means actuated by said power means for returning said indicator to an original position after the expiration of a second predetermined period of time, said period comprising a plurality of said first periods, and recording means actuated by said power means for making an inscribed record of the maximum position of said indicator during the return thereof to the original position, said recording means comprising a recording hand connected to said indicator to follow maximum indicating and returning movements thereof and a record receiving member to be engaged by said hand.

3. In combination, a maximum demand meter, including a member driven in response to demand and timing means for resetting said member to zero position after predetermined intervals of time, an indicator, one way driving means between said indicator and said member whereby the highest maximum value registered by said member during a plurality of said predetermined intervals is shown by the position of said indicator, means driven by said timing means for automatically returning said indicator to a zero position after a plurality of said predetermined intervals, and means operated by said time controlled means for making a permanently inscribed record of said highest maximum value during the return of said indicator to a zero position, said last means comprising a recording hand geared to said indicator to follow maximum indicating and returning movements thereof and a record receiving member movable to engage said hand at the beginning of return movement of said indicator.

RICHARD PUDELKO.

REFERENCES CITED

The following references are of record in the file of this patent:

UNITED STATES PATENTS

| Number | Name | Date |
|---|---|---|
| 1,708,972 | Lanphier et al. | Apr. 16, 1929 |
| 1,757,597 | Smith | May 6, 1930 |
| 1,781,588 | Marcellus | Nov. 11, 1930 |
| 2,149,410 | Weisman | Mar. 7, 1939 |
| 2,238,602 | Rosenberger | Apr. 15, 1941 |
| 2,268,705 | Green et al. | Jan. 6, 1942 |
| 2,305,504 | Wagner | Dec. 15, 1942 |